United States Patent
Motozawa et al.

(10) Patent No.: US 8,886,429 B2
(45) Date of Patent: Nov. 11, 2014

(54) OIL PRESSURE CONTROL DEVICE OF AUTOMATIC TRANSMISSION

(75) Inventors: Satoshi Motozawa, Wako (JP); Hideyuki Yamanaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/979,423

(22) PCT Filed: Jan. 30, 2012

(86) PCT No.: PCT/JP2012/052010
§ 371 (c)(1),
(2), (4) Date: Jul. 12, 2013

(87) PCT Pub. No.: WO2012/105507
PCT Pub. Date: Aug. 9, 2012

(65) Prior Publication Data
US 2013/0298713 A1 Nov. 14, 2013

(30) Foreign Application Priority Data
Feb. 1, 2011 (JP) .................. 2011-020258

(51) Int. Cl.
*G06F 7/00* (2006.01)
*F16H 61/00* (2006.01)
*F16H 61/02* (2006.01)

(52) U.S. Cl.
CPC ........ *F16H 61/0025* (2013.01); *F16H 61/0021* (2013.01); *F16H 61/0206* (2013.01)
USPC ............................................ 701/68; 477/180

(58) Field of Classification Search
CPC ............ F16H 61/0021; F16H 61/0025; F16H 61/0206
See application file for complete search history.

(56) References Cited

U.S. PATENT DOCUMENTS 5,971,889 A 10/1999 Ohashi et al.
7,289,892 B2 * 10/2007 Isogai et al. ............... 73/115.02
(Continued)

FOREIGN PATENT DOCUMENTS

JP 05-319146 A 12/1993
JP 05-322013 A 12/1993
(Continued)

OTHER PUBLICATIONS

International Search Report of PCT/JP2012/052010, mailing date of Feb. 21, 2012.
(Continued)

*Primary Examiner* — David D Le
(74) *Attorney, Agent, or Firm* — Westerman, Hattori, Daniels & Adrian, LLP

(57) ABSTRACT

An oil pressure control device includes: line pressure adjusting means for adjusting the line pressure; line pressure switching means for switching, in two stages, the line pressure adjusted by the line pressure adjusting means; a linear solenoid valve that adjusts a required oil pressure for engaging frictional engagement elements with one another by engagement force, which is required thereby, by adjusting a pressure of hydraulic oil with the line pressure; and control means for controlling a value of a current supplied to the linear solenoid valve. The control means performs control to differentiate the value of the current, which is supplied to the linear solenoid valve in order to adjust (obtain) the same required oil pressure, in response to the line pressure switched by the line pressure switching means.

2 Claims, 4 Drawing Sheets

(56) References Cited

U.S. PATENT DOCUMENTS 8,478,497 B2 * 7/2013 Kato et al. .................. 701/58
2011/0253919 A1 * 10/2011 Imamura et al. ......... 251/129.15

FOREIGN PATENT DOCUMENTS

| JP | 06-201033 A | 7/1994 |
|---|---|---|
| JP | 07-091528 A | 4/1995 |
| JP | 11-82724 A | 3/1999 |
| JP | 2002-089680 A | 3/2002 |
| WO | 2012/001665 A1 | 1/2012 |

OTHER PUBLICATIONS

Japanese Office Action dated Nov. 12, 2013, issued in corresponding Japanese Patent Application No. 2012-555866 with English translation (4 pages).

* cited by examiner

OIL PRESSURE CONTROL DEVICE OF AUTOMATIC TRANSMISSION

TECHNICAL FIELD

The present invention relates to an oil pressure control device of an automatic transmission, which includes: line pressure adjusting means for adjusting a line pressure that serves as a basic pressure for oil pressure control; and a linear solenoid valve that adjusts, based on the line pressure concerned, an oil pressure for engaging frictional engagement elements with one another by required engagement force.

BACKGROUND ART

In a vehicle, there are provided: an automatic transmission including a shift gear mechanism that transmits drive force at a predetermined gear ratio from an input shaft side to an output shaft side by selectively engaging a plurality of frictional engagement elements (clutches or brakes) with one another; and an oil pressure control device that controls an oil pressure for engaging the above-described frictional engagement elements with one another. Then, in order to realize a plurality of shift speeds by combinations of engagement/release of the respective frictional engagement elements, the oil pressure control device of the automatic transmission, which is as described above, includes: a regulator valve (line pressure adjusting means) that adjusts a line pressure serving as a basic pressure, which is for engaging the frictional engagement elements with one another, from an oil pressure of hydraulic oil supplied from an oil pressure supply source; and a linear solenoid valve that adjusts an oil pressure (required oil pressure) for engaging any of the plurality of fictional engagement elements by engagement force, which is required thereby, by adjusting the oil pressure of the hydraulic oil adjusted to the line pressure by the regulator valve.

Then, in the oil pressure control device as described above, for example, as shown in Patent Literatures 1 and 2, there are ones configured to be capable of switching the line pressure, which is adjusted by the regulator valve, in order to enhance fuel efficiency of the vehicle. That is to say, each of oil pressure control devices described in Patent Literatures 1 and 2 includes a linear solenoid valve for switching the line pressure, and is configured to switch the line pressure, which is adjusted by the regulator valve, in two stages of a high line pressure and a low line pressure by on/off control of the linear solenoid valve concerned.

PRIOR ART LITERATURES

Patent Literatures

Patent Literature 1: Japanese Patent Laid-Open Publication No. 2002-89680
Patent literature 2: Pamphlet of International Publication No. 2010/001665

DISCLOSURE OF THE INVENTION

Problems to be Solved by the Invention

Incidentally, in the oil pressure control device configured to switch the line pressure in two stages of the high line pressure and the low line pressure as described above, in the linear solenoid valve into which the hydraulic oil with the line pressure is introduced, there are properties that an overlap amount of a groove of a spool owned by the linear solenoid valve and a port of a valve body differs between a time of the high line pressure and a time of the low line pressure. In such a way, the oil pressure (required oil pressure) set by the linear solenoid valve in response to the required engagement force (engagement pressure) of the frictional engagement element becomes different oil pressures between the time of the high line pressure and the time of the low line pressure with respect to the same current value for controlling the linear solenoid valve. Then, there has been an apprehension that a shift shock may occur by the fact that the engagement pressure of the frictional engagement element is changed following the switching of the line pressure, bringing about a commercial value decrease of the transmission.

The present invention has been made in consideration of the above-mentioned points. It is an object of the present invention to provide an oil pressure control device of an automatic transmission, which is capable of keeping the oil pressure adjusted by the linear solenoid valve at a constant pressure with respect to the different line pressures by simple control, and is capable of preventing the occurrence of the shift shock, the occurrence following the change (switching) of the line pressure.

Means for Solving the Problems

The present invention for solving the above-described problem is an oil pressure control device of an automatic transmission, which has: an automatic transmission (7) having a drive force transmission mechanism (3) that transmits drive force in a predetermined gear ratio by selectively engaging a plurality of frictional engagement elements (3a) with one another; and an oil pressure control device (6) that controls an oil pressure for engaging the frictional engagement elements (3a) with one another, the oil pressure control device including: line pressure adjusting means (23) for adjusting a line pressure serving as a basic pressure, which is for engaging the frictional engagement elements (3a) with one another, from an oil pressure of hydraulic oil supplied from an oil pressure supply source (21); line pressure varying means (25) capable of changing the line pressure adjusted by the line pressure adjusting means (23); a linear solenoid valve (40) that adjusts a required oil pressure for engaging the frictional engagement elements (3a) with one another by engagement force, which is required by the frictional engagement elements (3a), by adjusting a pressure of the hydraulic oil adjusted to the line pressure by the line pressure adjusting means (23); and control means (10) for controlling the oil pressure, which is adjusted by the linear solenoid valve (40), by controlling a value of a current supplied to the linear solenoid valve (40), wherein the control means (10) performs control to differentiate the value of the current, which is supplied to the linear solenoid valve (40) in order to adjust (obtain) the same required oil pressure, in response to the line pressure changed by the line pressure varying means (25).

In accordance with the oil pressure control device of an automatic transmission according to the present invention, there is performed the control to differentiate the value of the current, which is supplied to the linear solenoid valve in order to adjust (obtain) the same required oil pressure, in response to the line pressure changed by the line pressure varying means. Accordingly, only by such simple control to differentiate the current value, the required oil pressure adjusted by the linear solenoid valve can be kept at a constant pressure with respect to the different line pressures. Hence, an engagement pressure of the frictional engagement elements can be prevented from being changed following the change of the line pressure, and accordingly, the occurrence of the shift shock, which follows the change of the line pressure, can be suppressed effectively.

Moreover, in the oil pressure control device according to the present invention, the required oil pressure adjusted by the linear solenoid valve is kept at a constant pressure by such control to switch the value of the current supplied to the linear solenoid valve. Therefore, it is not necessary to perform the switching for the required oil pressure in response to the line pressure. Hence, control for preventing the occurrence of the shift shock, which follows the change of the line pressure, is avoided becoming complicated.

Moreover, in the above-described oil pressure control device, preferably, the line pressure varying means (25) is line pressure switching means (25) capable of adjusting the line pressure by switching the line pressure in at least two stages of a high line pressure and a low line pressure, and the control means (10) controls the value of the current, which is supplied to the linear solenoid valve (40) in order to adjust (obtain) the same required oil pressure, so that a current value (I2) at a time of the low line pressure can become a larger current value than a current value (I1) at a time of the high line pressure.

In accordance with this configuration, in the case where the line pressure is switched in two stages of the high line pressure and the low line pressure, it is made possible to keep the required oil pressure, which is adjusted by the linear solenoid valve, at a constant pressure between the time of the high line pressure and the time of the low line pressure. Hence, in the oil pressure control device including the line pressure switching means capable of switching the line pressure in two stages of the high line pressure and the low line pressure, the occurrence of the shift shock, which follows the switching of the line pressure, can be suppressed effectively, and accordingly, a commercial value of the transmission can be ensured.

Note that reference numerals in parentheses here indicate reference numerals of constituents of an embodiment to be described later, which correspond thereto, as examples of the present invention.

Advantageous Effects of the Invention

In accordance with the oil pressure control device of the automatic transmission according to the present invention, the oil pressure adjusted by the linear solenoid valve can be kept at a constant pressure with respect to the different line pressures by the simple control, and accordingly, the occurrence of the shift shock, which follows the change of the line pressure, can be prevented.

BEST MODE FOR CARRYING OUT THE INVENTION

Figure 1:
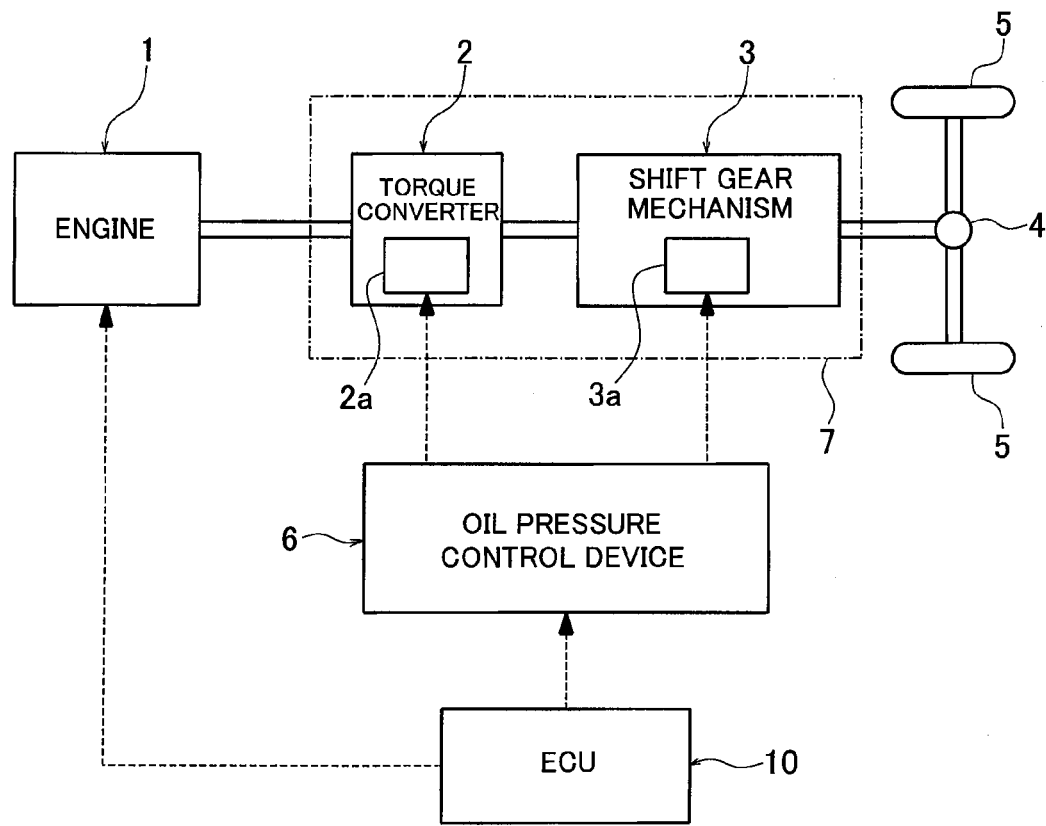
FIG. 1 is a block diagram schematically showing a power transmission system and control system of a vehicle including an oil pressure control device of an automatic transmission according to an embodiment of the present invention.

A description is made below in detail of an embodiment of the present invention with reference to the accompanying drawings. FIG. 1 is a block diagram schematically showing a power transmission system and control system of a vehicle including an oil pressure control device of an automatic transmission according to an embodiment of the present invention. The power transmission system of the vehicle, which is shown in FIG. 1, includes: an engine 1 as a drive source; a torque converter 2 for transmitting a rotational output of the engine 1 to a shift gear mechanism 3; the shift gear mechanism (drive force transmission mechanism) 3 that receives a rotational output of the torque converter 2, shifts the received rotational output at a set gear ratio, and outputs the shifted rotational output; and a differential gear mechanism 4 that distributes the outputted rotational output of the shift gear mechanism 3 to drive wheels 5 and 5.

An automatic transmission 7 is composed of the torque converter 2 and the shift gear mechanism 3, which are described above, and there is provided an oil pressure control device 6 for controlling an oil pressure of hydraulic oil supplied to the automatic transmission 7 concerned. The oil pressure control device 6 controls an oil pressure of hydraulic oil supplied to the shift gear mechanism 3, and thereby performs control to engage or release frictional engagement elements such as a plurality of oil pressure control-type clutches and brakes (hereinafter, simply referred to as "frictional engagement elements") 3a, which are provided in the shift gear mechanism 3, with or from one another in predetermined combinations. Moreover, the oil pressure control device 6 controls an oil pressure of hydraulic oil supplied to the torque converter 2, and thereby performs control to switch engagement/disengagement of a lock-up clutch 2a owned by the torque converter 2.

The control system for controlling the power transmission system of the vehicle is composed of: sensors (not shown) provided in the respective portions of the vehicle; an electronic control unit (ECU) 10 to which detection values of these respective sensors are inputted; and the oil pressure control device 6 controlled by the electronic control unit 10.

Figure 2:
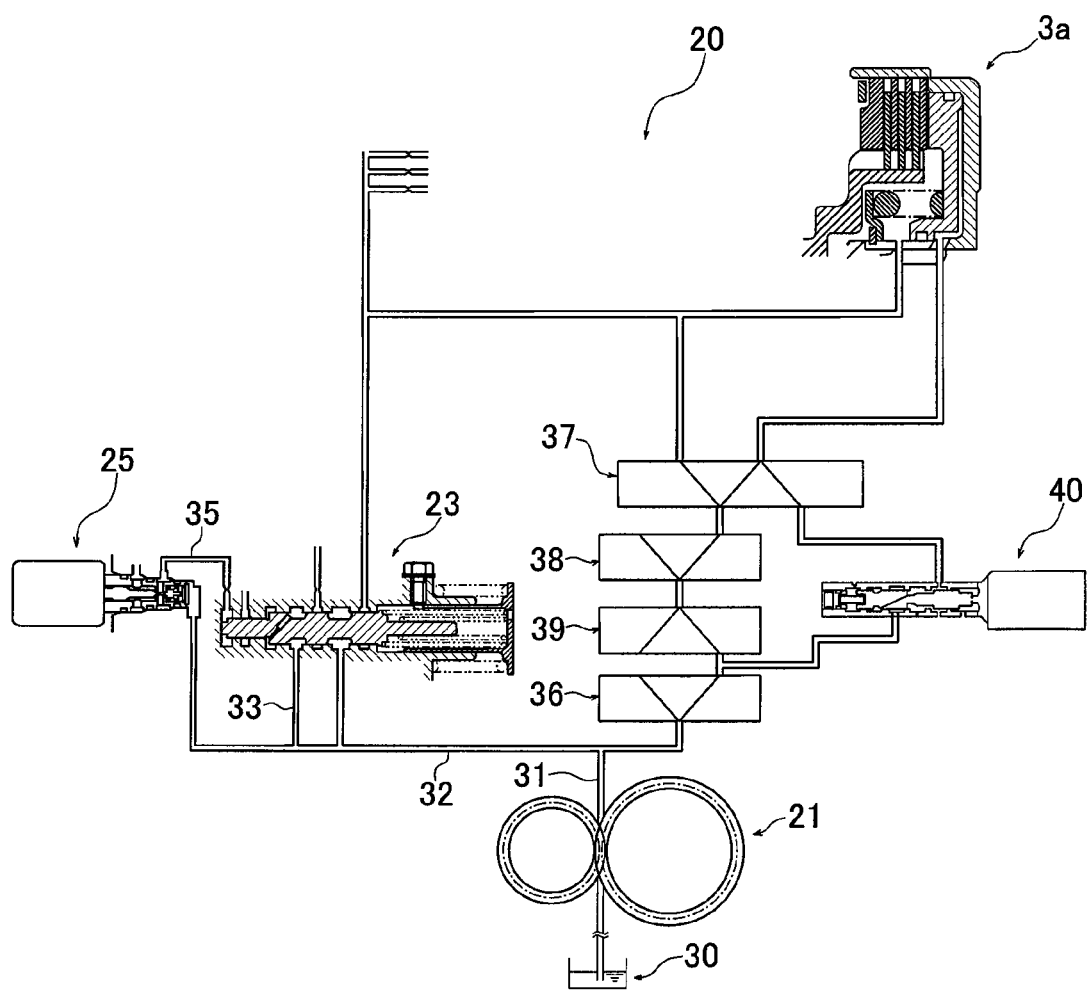
FIG. 2 is a view showing a part of an oil pressure circuit which the oil pressure control device includes.

FIG. 2 is a view schematically showing a part of an oil pressure circuit which the oil pressure control device 6 includes. The oil pressure circuit 20 shown in FIG. 2 includes: an oil pump 21 as an oil pressure supply source; a regulator valve 23 as line pressure adjusting means; a solenoid valve (hereinafter, described as a "line pressure switching valve") 25 as line pressure varying (switching) means. The oil pump 21 sucks up the hydraulic oil from an oil tank 30, and feeds the hydraulic oil with pressure to an oil passage 31. The regulator valve 23 adjusts a basic pressure of oil supplied from the oil pump 21, and generates a line pressure that serves as a basic pressure of the hydraulic oil, which is necessary for the engagement of the frictional engagement elements 3a and the like. The line pressure switching valve 25 is a valve that supplies an auxiliary pressure to the regulator valve 23 in order to switch the line pressure, which is adjusted by the regulator valve 23, in a plurality of stages (two stages of the high line pressure and the low line pressure in this embodiment).

Here, a description is made of the switching of the line pressure adjusted by the regulator valve 23, the switching being performed by the line pressure switching valve 25. That is to say, in a situation where a high engagement hydraulic oil pressure is not necessary for the frictional engagement elements 3a of the shift gear mechanism 3 in a running state of the vehicle, the line pressure switching valve 25 is opened (ON) by the control of the electronic control unit 10. By this opening of the line pressure switching valve 25, the regulator valve 23 is controlled by hydraulic oil (signal pressure of the low line pressure) that has passed through an oil passage 35 and by hydraulic oil that has passed through an oil passage 33. A pressure receiving area of the regulator valve 23 is increased as described above, whereby the line pressure adjusted in the regulator valve 23 is switched from the high line pressure to the low line pressure.

Meanwhile, in a situation where the high engagement hydraulic oil pressure is necessary for the frictional engagement elements 3a of the shift gear mechanism 3, the line pressure switching valve 25 is closed (OFF) by the control of the electronic control unit 10, whereby the hydraulic oil (signal pressure of the low line pressure) is not allowed to be supplied to the oil passage 35. In such a way, the regulator valve 23 is controlled only by the hydraulic oil that has passed through the oil passage 33. The pressure receiving area of the regulator valve 23 is reduced as described above, whereby the line pressure is switched from the low line pressure to the high line pressure. As described above, the pressure receiving area of the regulator valve 23 is changed by the line pressure switching valve 25, whereby the line pressure can be switched in two stages of the high line pressure and the low line pressure.

The hydraulic oil adjusted to the line pressure by the regulator valve 23 passes via an oil passage 32 through a variety of valves such as a manual valve 36, a shift valve 37 and cut valves 38 and 39, which are installed downstream of the oil passage 32, and is sent to a linear solenoid valve 40. In the linear solenoid valve 40, a thrust generated in the solenoid is applied to the hydraulic oil, whereby an oil pressure (hereinafter, referred to as a "required oil pressure") for engaging the frictional engagement elements 3a with one another by required engagement force is adjusted. In this event, the ECU 10 controls a value of a current supplied to a solenoid of the linear solenoid valve 40, and thereby controls the above-described required oil pressure.

The hydraulic oil adjusted to the required oil pressure by the linear solenoid valve 40 is sent to the frictional engagement elements 3a of the shift gear mechanism 3, which are a supply destination of the required oil pressure. In the frictional engagement elements 3a, the engagement of the frictional engagement elements such as the clutches and the brakes is controlled by the oil pressure of the supplied hydraulic oil.

Note that, in actual, the oil pressure circuit which the oil pressure control device 6 includes is composed of: the frictional engagement elements such as the plurality of clutches and brakes, which correspond to the respective shift speeds set by the shift gear mechanism 3; large numbers of the valves and the oil passages, which serve for supplying the hydraulic oil to the frictional engagement elements concerned; and the like; however, the oil pressure circuit 20 of FIG. 2 is a circuit in which only a part of the above-described components is schematically illustrated. Here, illustration and description of other portions of the oil pressure circuit which the oil pressure control device 6 includes are omitted.

Hence, in the description and FIG. 2 of this embodiment, the frictional engagement elements 3a of the shift gear mechanism 3 are shown as an example of the supply destination of the hydraulic oil adjusted to the required oil pressure by the linear solenoid valve 40; however, besides this, the hydraulic oil adjusted to the required oil pressure by the linear solenoid valve 40 is also sent to other frictional engagement elements such as clutches and brakes, which the shift gear mechanism 3 includes, the lock-up clutch 2a which the torque converter 2 includes, and the like by switching control for the oil passages.

Incidentally, in the oil pressure control device 6 that switches the line pressure in two stages of the high line pressure and the low line pressure as in this embodiment, in the linear solenoid valve 40 into which the hydraulic oil with the line pressure is introduced, there are properties that an overlap amount of a groove of a spool and a port of a valve body differs between the time of the high line pressure and the time of the low line pressure. In such a way, the oil pressure (required oil pressure) set by the linear solenoid valve 40 in response to the required engagement force (engagement pressure) of the frictional engagement elements 3a becomes different oil pressures between the time of the high line pressure and the time of the low line pressure with respect to the same current value for controlling the linear solenoid valve 40.

In this connection, in order to cope with the above-mentioned problem, the oil pressure control device 5 of this embodiment controls a value of a current, which is supplied to the linear solenoid valve 40, by the ECU 10, and thereby performs control for the oil pressure adjusted by the linear solenoid valve 40. In the control concerned, there is performed control to differentiate the value of the current, which is supplied to the linear solenoid valve 40 in order to adjust (obtain) the same required oil pressure, in response to the line pressure switched by the line pressure switching valve 25 (hereinafter, this control is referred to as "current value switching control"). A description is made below in detail of this current value switching control.

Figure 3:
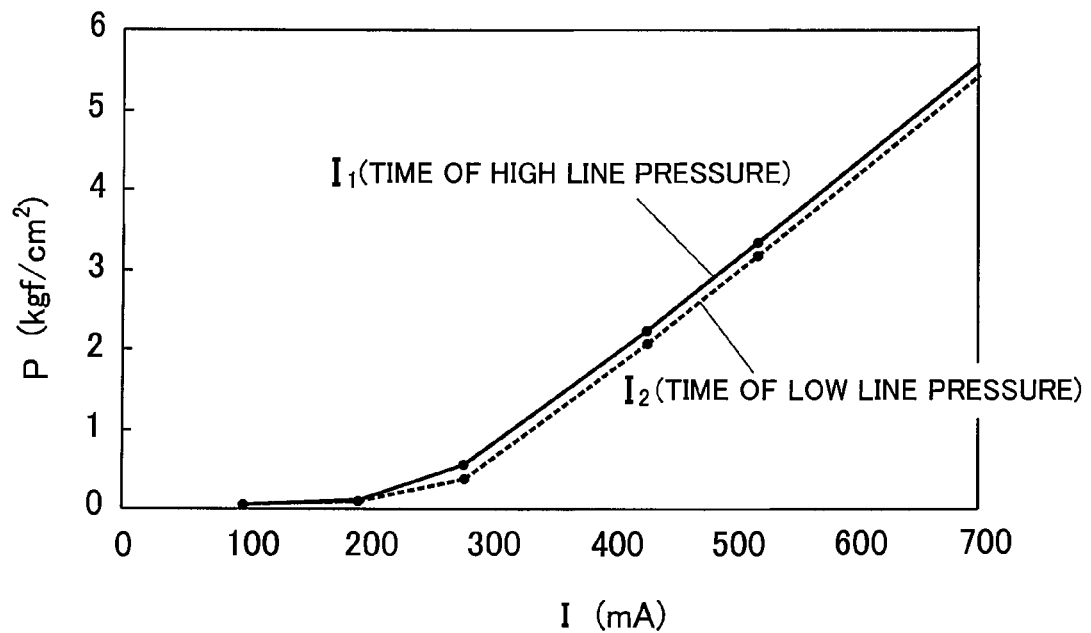
FIG. 3 is a graph showing a relationship between a value of a current supplied to a linear solenoid valve and a required oil pressure corresponding to the value of the current.

FIG. 3 is a graph showing a relationship between the value of the current supplied to the linear solenoid valve 40 and the required oil pressure corresponding thereto. In the graph of FIG. 3, an axis of abscissas represents the value (current value) I of the current supplied to the linear solenoid valve 40, and an axis of ordinates represents the oil pressure (required oil pressure) P adjusted by the linear solenoid valve 40 in response to the current value I concerned. Then, in this graph, as current values for adjusting (obtaining) the same required oil pressure, there are shown a current value (current value shown by a solid line) I1 selected at the time of the high line pressure and a current value (current value shown by a dotted line) I2 selected at the time of the low line pressure. As shown in this graph, with regard to the current values for adjusting (obtaining) the same required oil pressure by the linear solenoid valve 40, the current value I2 at the time of the low line pressure becomes a larger value than the current value I1 at the time of the high line pressure.

Figure 4:
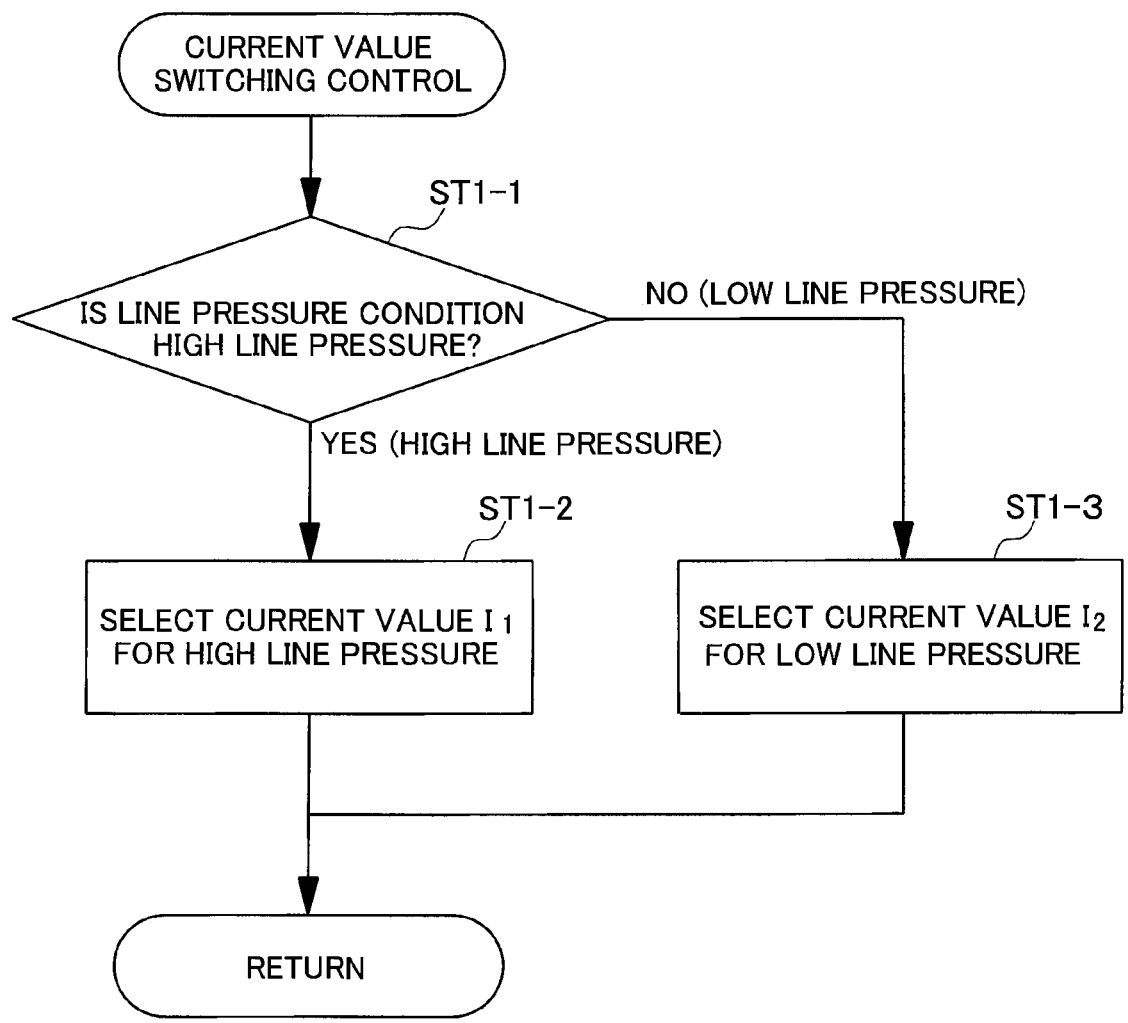
FIG. 4 is a flowchart showing a procedure of control (current value switching control) for changing the value of the current supplied to the linear solenoid valve.

FIG. 4 is a flowchart showing a procedure of the current value switching control performed by the oil pressure control device 6. In the current value switching control, first, it is determined whether or not a line pressure condition switched by the line pressure switching valve 25 is the high line pressure (Step ST1-1). As a result, if the line pressure condition is the high line pressure (YES), then the current value I1 for the high line pressure, which is shown by the solid line in the graph of FIG. 4, is supplied to the linear solenoid valve 40 (Step ST1-2). Meanwhile, if the line pressure condition is the low line pressure (NO), then the current value I2 for the low line pressure, which is shown by the dotted line in the graph of FIG. 4, is supplied to the linear solenoid valve 40 (Step ST1-2). By performing the control as described above, the required oil pressure adjusted by the linear solenoid valve 40 can be kept at a constant pressure between the case where the line pressure is the high line pressure and the case where the line pressure is the low line pressure.

As described above, in the oil pressure control device 6 of this embodiment, in response to the line pressure switched by the line pressure switching valve 25, there is performed such control to change the value of the current, which is supplied to the linear solenoid valve 40 in order to adjust the required oil pressure for engaging the frictional engagement elements 3a, which the shift gear mechanism 3 includes, with one another by the required engagement force. In such a way, the same oil pressure can be adjusted (obtained) by the linear solenoid valve 40 with respect to the different line pressures by the simple control, and accordingly, the occurrence of the shift shock, which follows the switching of the line pressure, can be suppressed effectively.

Moreover, in this oil pressure control device 6, the required oil pressure adjusted by the linear solenoid valve 40 can be kept at a constant pressure only by the switching (switching of I-P characteristics) of the value of the current supplied to the linear solenoid valve 40. Therefore, it is not necessary to perform the switching for the required oil pressure in response to the line pressure. Hence, control for preventing the occurrence of the shift shock, which follows the switching of the line pressure, is avoided becoming complicated.

In the oil pressure control device of this embodiment, the regulator valve 23 is capable of adjusting the line pressure in two stages of the high line pressure and the low line pressure, and with regard to the value of the current supplied to the linear solenoid valve 40 in order to adjust (obtain) the same required oil pressure to the frictional engagement elements 3a, the current value I2 at the time of the low line pressure is allowed to become a larger current value than the current value I1 at the time of the high line pressure (I1≤I2). As described above, the value of the current supplied to the linear solenoid valve 40 is made larger at the time of the low line pressure than at the time of the high line pressure, whereby it is made possible to keep the required oil pressure, which is adjusted by the linear solenoid valve 40, at a constant oil pressure between the time of the high line pressure and the time of the low line pressure. Hence, in the oil pressure control device 6 capable of switching the line pressure in two stages of the high line pressure and the low line pressure, the occurrence of the shift shock, which follows the switching of the line pressure, can be suppressed effectively, and the commercial value of the transmission can be ensured.

The description has been made above of the embodiment of the present invention; however, the present invention is not limited to the above-described embodiment, and is modifiable in various ways within the scope of claims and within the scope of the technical ideas described in the specification and the drawings. For example, in the above-described embodiment, the description has been made of the case where it is possible to switch the line pressure, which is adjusted by the linear solenoid valve 40, in two stages of the high line pressure and the low line pressure by the line pressure switching valve 25; however, the line pressure adjusting means, which the oil pressure control device according to the present invention includes, may be configured so as not only to switch the line pressure in two stages of the high line pressure and the low line pressure as described above but also to switch the line pressure in multi stages of three stages or more as long as being capable of switching the line pressure in a plurality of stages.

The invention claimed is:

1. An oil pressure control device of an automatic transmission, which includes:

the automatic transmission including a drive force transmission mechanism that transmits drive force in a predetermined gear ratio by selectively engaging a plurality of frictional engagement elements with one another; and the oil pressure control device that controls an oil pressure for engaging the frictional engagement elements with one another, the oil pressure control device comprising:

line pressure adjusting means for adjusting a line pressure serving as a basic pressure, the basic pressure being for engaging the frictional engagement elements with one another, from an oil pressure of hydraulic oil supplied from an oil pressure supply source;

line pressure varying means capable of changing the line pressure adjusted by the line pressure adjusting means;

a linear solenoid valve that adjusts a required oil pressure for engaging the frictional engagement elements with one another by engagement force, the engagement force being required by the frictional engagement elements, by adjusting a pressure of the hydraulic oil adjusted to the line pressure by the line pressure adjusting means; and control means for controlling the oil pressure, the oil pressure being adjusted by the linear solenoid valve, by controlling a value of a current supplied to the linear solenoid valve, wherein the control means sets a plurality of current values as the value of the current supplied to the linear solenoid valve in order to adjust (obtain) the same required oil pressure, and selects one current value from the plurality of current values in response to the line pressure changed by the line pressure varying means, and thereby performs control to switch the value of the current supplied to the linear solenoid valve in order to adjust the same required oil pressure.

2. The oil pressure control device of an automatic transmission according to claim 1, wherein the line pressure varying means is line pressure switching means capable of adjusting the line pressure by switching the line pressure in at least two stages of a high line pressure and a low line pressure, and the control means controls the value of the current, the current being supplied to the linear solenoid valve in order to adjust the same required oil pressure, so that a current value at a time of the low line pressure can become a larger current value than a current value at a time of the high line pressure.

* * * * *